United States Patent [19]

Holt

[11] 4,345,513
[45] Aug. 24, 1982

[54] ELECTRIC TOASTER

[75] Inventor: David Holt, Cambridge, England

[73] Assignee: Pifco Limited, Failsworth, England

[21] Appl. No.: 235,272

[22] Filed: Feb. 17, 1981

[30] Foreign Application Priority Data

Feb. 23, 1980 [GB] United Kingdom ............... 8006210

[51] Int. Cl.³ ............................................. A47J 37/08
[52] U.S. Cl. ............................... 99/327; 74/424.8 R; 99/332; 99/335; 99/337; 99/391; 99/401
[58] Field of Search ................ 99/326, 327, 400, 331, 99/332, 334, 335, 385, 389, 391, 393, 401, 386, 387, 337; 74/424.8 R, 405

[56] References Cited

U.S. PATENT DOCUMENTS

| | | | |
|---|---|---|---|
| 1,530,387 | 3/1925 | Marra | 99/387 |
| 1,691,361 | 11/1928 | Roberts | 99/386 |
| 1,954,895 | 4/1934 | Shenton | 99/332 |
| 2,036,826 | 4/1936 | Peters | 99/386 |
| 2,662,465 | 12/1953 | Beer | 99/391 X |
| 2,765,543 | 10/1956 | Crowell et al. | 74/424.8 R |
| 3,106,352 | 10/1963 | Bennett | 74/424.8 R |
| 3,257,935 | 6/1966 | Temperato | 99/386 |
| 3,358,584 | 12/1967 | Sutton et al. | 99/391 X |
| 3,472,154 | 10/1969 | Dokos et al. | 99/391 |
| 4,142,459 | 3/1979 | Lalancette | 99/391 X |
| 4,286,509 | 9/1981 | Miller | 99/332 |

FOREIGN PATENT DOCUMENTS 948281  7/1949  France ................................. 99/391

Primary Examiner—Billy J. Wilhite
Attorney, Agent, or Firm—Sughrue, Mion, Zinn, Macpeak and Seas

[57] ABSTRACT

A toaster for toasting a slice of bread comprises a casing in which a reciprocable carriage is located and is movable towards and away from an aperture defined by the casing through which aperture a slice of bread when mounted on the carriage can pass. A pair of enclosed electric bar heating elements is disposed within the casing respectively adjacent opposed side edges of the casing defining the aperture. A motor arrangement is provided for the carriage which can thereby be driven from a first position remote from the aperture into a second position at a predetermined speed. In this way a slice of bread mounted on the carriage can be made to pass between the elements to toast both sides of the slice progressively as the slice passes out of the casing through the aperture. The degree of toasting is determined by the speed of movement of the carriage.

13 Claims, 5 Drawing Figures

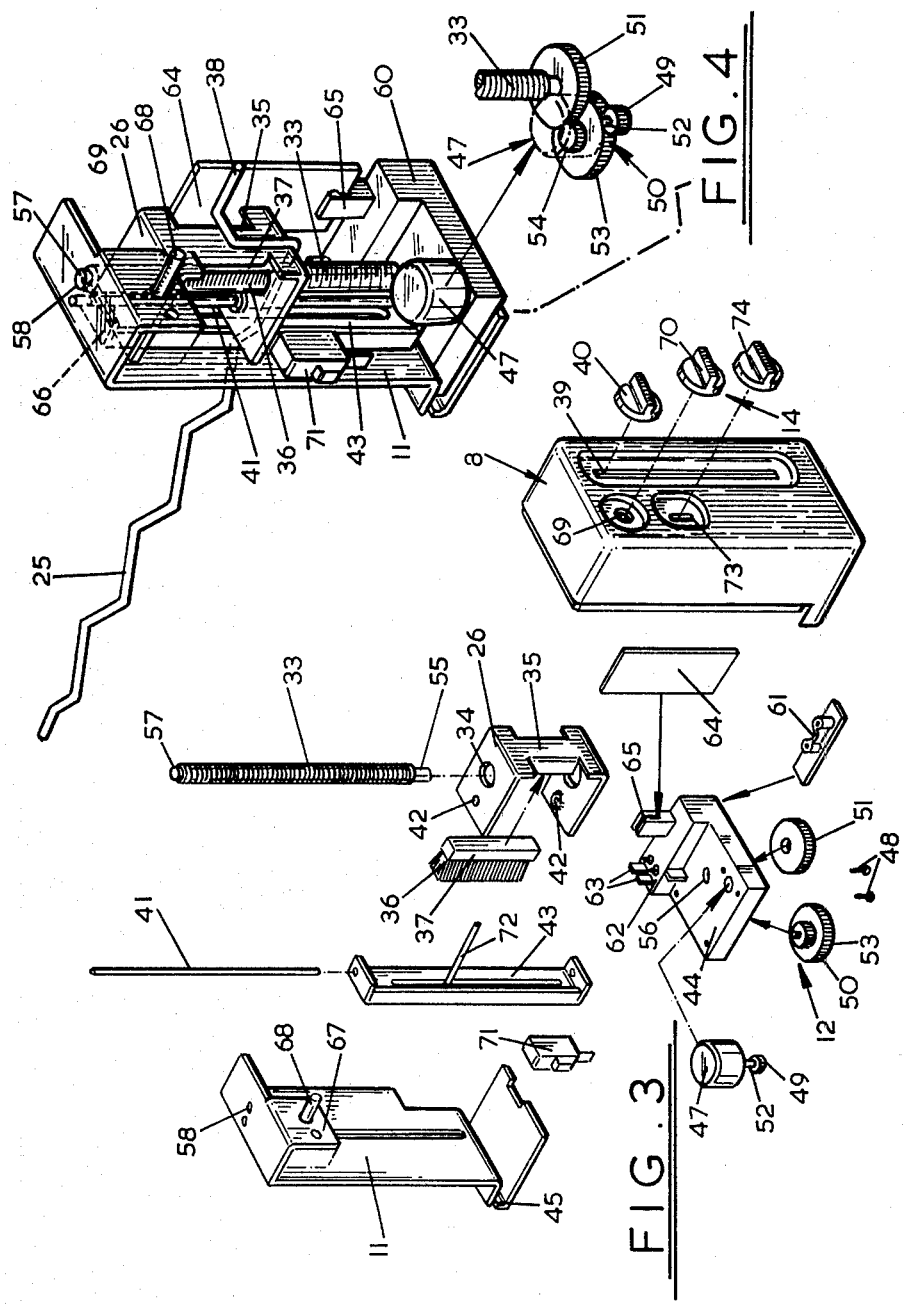

ELECTRIC TOASTER

This present invention relates to a toaster for toasting a slice of bread or the like, and embodies a linear drive arrangement as disclosed in applicant's copending application Ser. No. 235,271.

In a conventional "pop-up" toaster for toasting slices of bread or similar, a reciprocable carriage is provided within a casing and is movable towards and away from an upper aperture defined by the casing through which aperture a slice of bread when mounted on the carriage can pass. The carriage is usually spring biassed towards the aperture and the toaster is provided with a catch whereby the carriage can be retained against the force of the spring for a predetermined time. Wire electrical elements are located in the casing between which elements the carriage is located. In this way a slice of bread can be mounted on the carriage, the carriage depressed until retained by the catch, which simultaneously activates the elements, and the bread thereby toasted as it occupies a position between the elements. When the predetermined time is up, the catch is opened to release the carriage, which under the influence of the spring "pops up" to elevate the toast through the aperture.

Such a toaster has several disadvantages, including the slow speed of toasting and the lack of uniform toasting over the surface of the toast. In addition, after the toaster has been used for some time, the catch tends either to stick so as not to release the carriage, which results in burnt toast, or so as to not retain the carriage at all.

The object of the present invention is to provide a novel toaster which overcomes or substantially mitigates the aforesaid disadvantages of conventional "pop-up" toasters.

According to the present invention there is provided a toaster for toasting a slice of bread comprising a casing in which is located a reciprocable carriage movable towards and away from an aperture defined by the casing through which aperture a slice of bread when mounted on the carriage can pass, characterised in that a pair of enclosed electric bar heating elements is disposed within the casing respectively adjacent opposed side edges of the casing which edges define said aperture, and a motor arrangement is provided for the carriage whereby the carriage can be driven from a first position located remote from the aperture towards the aperture into a second position at a predetermined speed and whereby a slice of bread mounted on the carriage can be made to pass between the elements to toast both sides of the slice progressively as the slice passes out of the casing through the aperture, the degree of toasting being determined by the speed of movement of the carriage.

Preferably, the carriage is movable manually from the second position back into the first position.

Preferably also the motor arrangement and heating elements are connected into an electrical circuit which when connected to an electrical power supply can be activated to cause operation of the motor arrangement and heating of the elements by movement of the carriage into the first position and deactivated by attainment of the second position by the carriage.

Preferably also, the speed of movement of the carriage can be varied whereby a speed can be preselected before operation of the motor arrangement according to the required degree of toasting of the slice of bread.

The advantages of the toaster of the present invention are that as toasting occurs as the bread passes between the elements, there is uniformity in the degree of toasting over the whole slice and toasting to the correct degree thereof occurs virtually instantaneously on the portion of the slice between the elements, which portion is progressively varying over the whole slice. Additionally, as the carriage is positively driven between the elements there is less likelihood of the carriage being trapped than in the prior art.

The present invention will now be described by way of example with reference to the accompanying drawings, in which:

FIG. 3 is an enlarged view of part of FIG. 2 showing the motor arrangement of the toaster;

FIG. 4 is a perspective view of the motor arrangement shown in FIG. 3 when assembled; and FIG. 5 is a cross-section along the line V—V in FIG. 1.

Figure 1:
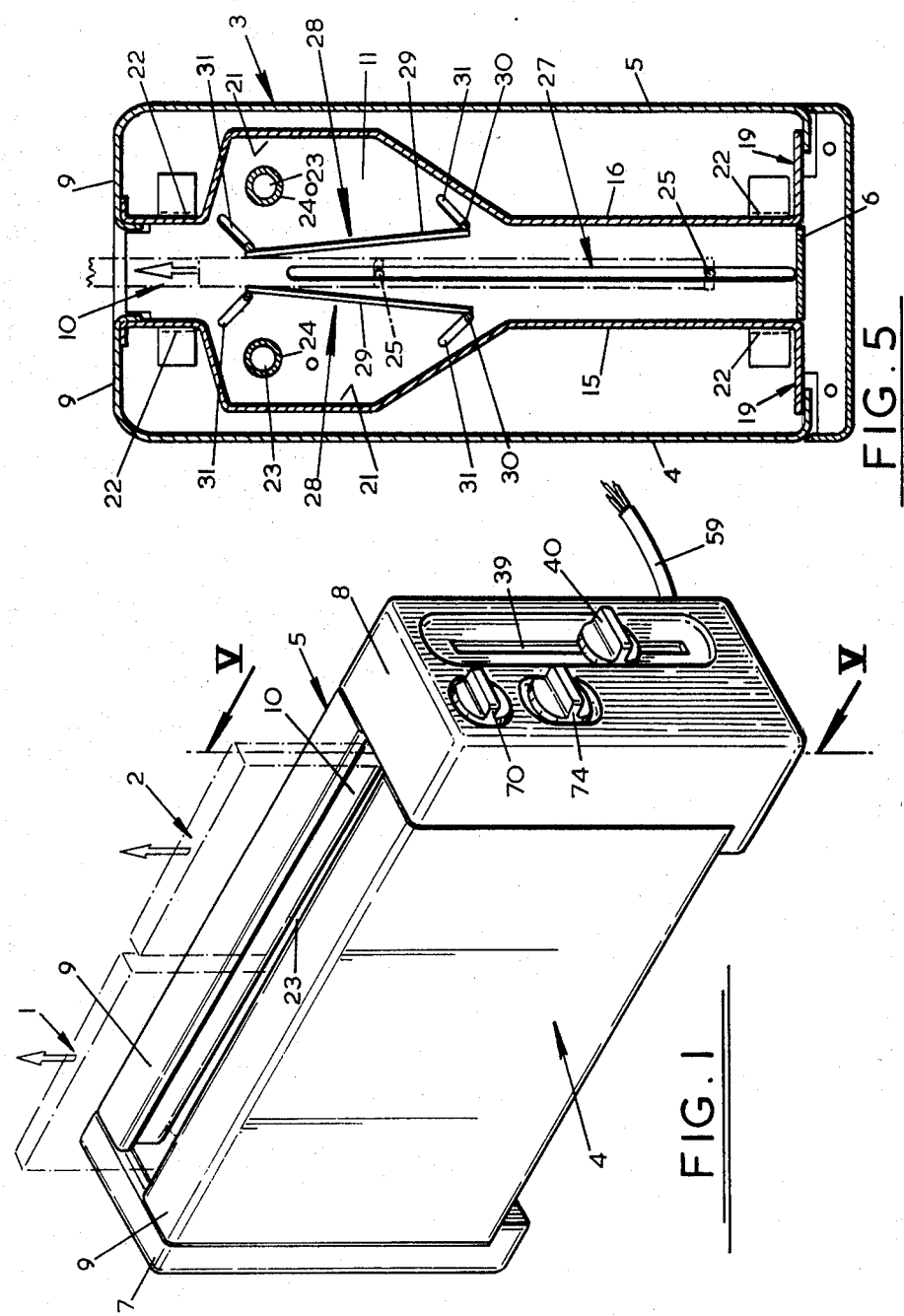
FIG. 1 is a perspective view of a toaster according to the present invention.
Figure 2:
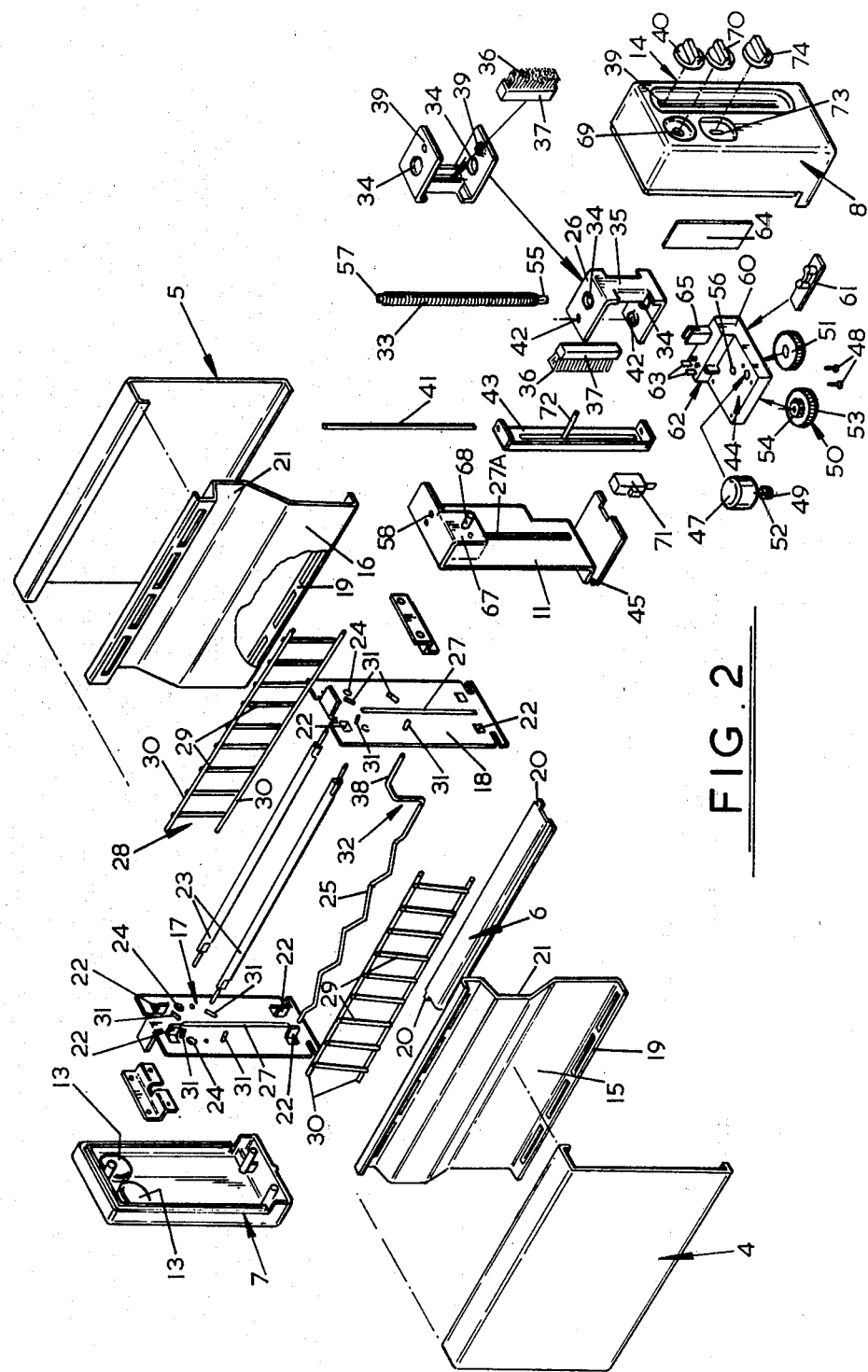
FIG. 2 is an exploded view of the toaster shown in FIG. 1.

The toaster, as shown particularly in FIG. 1, is intended to toast simultaneously two slices 1 and 2 of a loaf, which are disposed in a side-by-side relationship. The size of the toaster will determine the maximum size of bread slice which can be accommodated but in general the toaster will accommodate most sizes and shapes of bread slices as well as similar products such as muffins and crumpets.

The toaster comprises a box-like casing 3 made up of opposed side wall members 4 and 5, a base plate 6, and two end wall members 7 and 8. The top face 9 of the toaster does not comprise a separate member but is defined by portions of the side members 4 and 5 and the end members 7 and 8, which portions are disposed perpendicularly to the sides and ends of the casing 3 and define a rectangular aperture 10. The end wall members 7 and 8 also provide feet for the toaster below the level of the base plate 6. The aperture 10 enables the bread slices 1 and 2 to be introduced into the casing 3 for toasting. The end wall member 8 is of a greater size than the end wall member 7 and is provided with an additional wall 11 to form a box casing in which is located a motor arrangement 12 for the toaster as is described below. The end wall member 7 is provided with a pair of recesses 13 and the wall member 8 accommodates three control knobs 14, as is described below, whereby the recesses 13 and the knobs 14 form hand grips for transport of the toaster.

Located within the casing 3 adjacent the side and end wall members 4, 5, 7 and 8 respectively are shiny metal reflector plates 15, 16, 17 and 18. The side wall members 4 and 5 hook over the plates 15 and 16 and the end wall reflector plates 17 and 18 are substantially planar and are screwed to and cover the end wall member 7 and the wall 11 respectively. The lower edge of each of the plates 15 and 16 is formed into a perpendicular flange 19, between which flanges 19 the base plate 6 is located. The plate 6 is also made of shiny metal to form a reflector and is hinged at its ends by projections 20 into the plates 17 and 18 so that it can pivot outwardly of the toaster. In this way, the plate 6 permits crumbs which fall to the bottom of the toaster to be removed therefrom. The plate 6 snap-fits into a closed position between the flanges 19. In addition the upper parts of the side wall reflector plates 15 and 16 are horizontally cranked as at 21 towards the side wall members 4 and 5, which are completely covered by the plates 15 and 16. The plates 15 and 16 are attached to flaps 22 which have been pressed out of the plane of the plates 17 and 18.

Disposed within the casing 3 respectively adjacent the side edges of the rectangular aperture 10 is a pair of enclosed electric bar heating elements 23. The elements 23 are disposed horizontally and lie respectively within the cranked portions 21 of the side reflector plates 15 and 16. The ends of each of the elements 23 pass through apertures 24 formed in the end reflector plates 17 and 18 and in this way the elements 23 are supported in position in the toaster. Electrical wiring (not shown) for supplying power to the elements 23 is located in gaps between the plate 15 and the end wall member 7 and between the plate 16 and the wall 11 and leads from the elements 23 to circuitry contained within the casing formed by the wall 11 and the end wall member 8.

A reciprocable carriage for carrying the bread slices 1 and 2 is located within the casing 3 between the side wall reflector plates 15 and 16. The carriage comprises a horizontally disposed bread support 25 attached to a frame 26 which is driven by the motor arrangement 12 as is described below. The support 25 comprises a wavy wire member which can support the lower edge of a slice of bread when located vertically in the toaster. The ends of the support 25 locate in two vertical slots 27 formed respectively in the end reflector plates 17 and 18 and these slots 27 form guides for the vertical reciprocable movement of the support 25.

It will be appreciated that the uppermost position of the support 25 made possible by the length of the slots 27 is arranged to be above or at the same level as the elements 23 so that the bread slices carried by the support can be completely toasted on both sides as the support 25 moves upwardly.

The bread is guided whilst it is located in the toaster by a pair of grilles 28 which are located adjacent the side reflector plates. The grilles 28 comprise a series of spaced vertical wires 29 attached to and between upper and lower horizontal wires 30. The ends of the wires 30, locate in slots 31 formed in the end reflector plates 17 and 18, which slots 31 are inclined upwardly and cause the grilles 28 to incline to one another towards the aperture 10. In this way a slice of bread 1 or 2 is gently guided into a vertical position during passage between the elements 23 as it travels upwardly on the bread support 25. In a variation, the grilles 28 may be lightly sprung so as to be biassed towards one another to guide the toast.

One end portion 32 of the support 25 is elongated and bent through three right-angles. The end 32 projects through the vertical slot 27 in the reflector plate 18 and through a corresponding slot 27A in the wall 11 and is attached to the frame 26. The right angles in the end 32 permit the end 32 to pass around other components of the motor arrangement 12. The frame 26 is mounted to travel over a screw threaded rod 33 that is vertically located within the end member 8. The frame 26 comprises a one piece member which is provided with aligned holes 34 through which the rod 33 passes. A channel section holder 35 is formed in the frame 26 and a brush member comprising a brush 36 attached to a backing block 37 is fitted into the holder 35 so that the bristles of the brush 36 project from the holder 35 and engage the screw threads formed on the surface of the rod 33. In order to increase the force of the bristles of the brush 36 on the rod 33, the backing block 37 can be spring biassed towards the rod 33 or have pressure exerted thereon by screws (not shown).

Preferably the brush 36 is made of resilient non-metallic bristles such as natural bristles, for example, badger hairs, or nylon bristles. However, the bristles can be made of metal such as aluminium.

The tip 38 of the end portion 32 of the support 25 projects from the frame 26 and passes out of the casing 3 through a vertical elongate slot 39 formed in the end wall of the end wall member 8. The tip 38 has snap fitted thereto a control knob 40, firm manual movement of which knob 40 downwardly causes the support 25 and thereby the frame 26 to move downwardly in the toaster by causing the bristles of the brush 36 to flex resiliently and ride over the screw threads of the rod 33. The carriage for the bread can also be made to move upwardly in the toaster by movement of the knob 40 upwardly but this is not intended to be necessary in correct operation of the toaster.

To prevent the frame 26 from tending to rotate when travelling over the rod 33, a thick wire 41 is located through a second pair of aligned holes 42 in the frame 26. An elongate member 43 floats on the wire for a purpose which is described below and the upper end of the wire 41 is connected to an overhanging portion of the wall 11 whereas the lower end of the wire 41 is connected to a hollow support block 44.

The hollow support block 44 is located at the base of the end wall member 8 and is accommodated in a recess 45 at the base of the wall 11. The block 44 comprises an upper surface 46 on which is located an electric motor 47. The motor 47 is held in position by screws 48. Beneath the surface 46 in a hollow portion of the block 45 are located gear wheels 49, 50 and 51. The gear wheel 49 is driven directly by the output spindle 52 of the motor 47, which spindle 52 passes through the surface 46 of the block 45. The gear wheel 49 drives the larger wheel 53 of two toothed wheels 53, 54 forming the gear wheel 50, which wheel 53 causes the wheel 54 to rotate and to drive the gear wheel 51. A spigot 55 at the lower end of the rod 33, passes through an aperture 56 in the surface 46 and is connected to the centre of the gear wheel 51. The upper end 57 of the rod 33 fits into an aperture 58 in the overhanging portion of the wall 11 which forms a bearing so that the rod 33 is free to rotate when it is driven by the motor 47 via the reduction gearing.

The toaster is intended to be powered by a mains electricity supply via a cable 59. The cable 59 enters the casing 3 at the lower portion of the end wall member 8 and enters a hollow portion 60 of the block 45 adjacent the portion accommodating the gear wheels 49, 50 and 51. Within the portion 60, the cable 59 is securely retained by means of a clamp 61 and is connected to a terminal block 62 at one end of the block 45. Connections 63 project from the upper surface of the block 45 and are connected via a dropper resistor (not shown) to a printed circuit board 64 which is attached by a clip 65 to the upper surface of the block 45. The circuit board 64 controls operation of the motor 47 but the elements 23 are powered directly from the cable 59 via the terminal block 45.

The speed of the motor 47 is controlled by a potentiometer 66 (FIG. 4) which is also wired into the board 64 and which is attached to the wall 11 beneath the overhang thereof and behind a depending portion 67. The potentiometer 66 is provided with a projecting horizontal rod 68 which passes through an aperture 69 in the end wall member 8 and is connected to a knob 70. This second control knob 70 is disposed adjacent the control knob 43 and controls the degree of toasting. As is described below, the speed of the motor 47 affects the degree of toasting so that the control knob 43 is used for preselection of the degree of toasting required before use of the toaster. The knob 70 can be turned to alter the setting of the potentiometer 66.

Operation of the motor 47 and the elements 53 is controlled via a microswitch 71 when the toaster is connected to a mains electricity supply. The microswitch 71 is connected to the circuit board 64 and is itself attached to the wall 11. The member 43 trips the microswitch on and off via projections (not shown). The member 43 floats on the wire 41 and is affected by movement of the bread carriage so that the lowermost position and the uppermost position of the bread carriage 26 causes the member 43 to trip the microswitch 71. Location of the carriage 26 in the lowermost position causes activation of the motor 47 and operation of the elements 23 whereas locating of the carriage in the uppermost position causes deactivation of the motor 47 and the switching off of the elements 23.

In addition, a rod 72 projects from the member 43 and projects through a slotted aperture 73 in the end wall member 8. A third control knob 74 is connected to the rod 72 so that if the knob 74 is moved upwardly or downwardly the rod 72 causes the member 43 to trip the microswitch 71 off or on. This third control knob 74 thus acts as an override and is intended to be used in two situations. Firstly, if the slice of bread to be toasted is smaller than the height of the total possible travel distance of the bread carriage then the carriage need only be depressed, as is described below by a sufficient distance to toast the smaller bread size adequately. However, as in this case the carriage will not cause the member 43 to activate the microswitch 71 to put the motor 47 and the elements 23 in operation, the override can be used by way of the knob 74 to trip the microswitch 71 to activate these components. Secondly, as a safety measure the knob 74 can also be used to cut off electrical power to the motor 47 and the elements 23.

In use, the toaster is connected to a mains electricity supply via the cable 59 and the bread slices 1 and 2 to be toasted are located through the aperture 10 in a side-by-side relationship. The bread carriage should normally be in its uppermost condition so that the bread slices 1 and 2 rest on the support 25 between the tops of the grilles 28. The control knob 70 is then adjusted to preselect the degree of toasting required so that the speed of the motor 47 is controlled by the potentiometer 66. The control knob 40 is then depressed so that the carriage is lowered and the bristles of the brush 36 ride over the screw threaded surface of the rod 33. When the support 25 reaches its lowermost position it causes the member 43 to activate the microswitch which causes immediate operation of the elements 23 which heat to maximum heat within approximately three or four seconds. The motor 47 is also activated and begins to drive the rod 33 against the surface of which the bristles of the brush 36 press. These bristles follow the screw threads formed on the rod 33 so that the frame 26 and thereby the bread support 25 are forced to move upwardly, the frame 26 passing over the rod 33. As the support 25 rises, the bread slices 1 and 2 are passed between the elements 23 and progressively toasted on both sides, the degree of toasting depending on the speed of travel of the carriage 25 which in turn depends on the speed of rotation of the rod 33 and the speed of the motor 47. As the carriage 25 rises the toasted bread slices pass out of the toaster through the aperture 10. When the carriage 25 reaches its uppermost position, which is above the horizontal level of the elements 23 in the toaster, the support 25 causes the member 43 to trip the microswitch 71 so that the electricity supply to the elements 23 and the motor 47 is cut off. The bread slices 1 and 2 have now been toasted completely and remain resting on the support 25 and against the sides of the aperture until removed and further bread can then be toasted in exactly the same way as described above.

It will be appreciated that during toasting of the bread slices 1 and 2, the reflector plates 15, 16, 17 and 18 reflect radiant heat falling on them from the elements 23 back towards the bread to mitigate wastage of energy and to prevent other components of the toaster, particularly the casing 3, from being excessively heated.

The toaster described above has several advantages over conventional domestic toasters. Firstly, the electrical elements 23 are enclosed so that if they are touched while they are connected to an electricity supply the result may be burning but they cannot administer an electric shock, which could kill. It will be appreciated that there are no electrically live components which are accessible in the toaster either through the aperture 10 or through the lower aperture when the base plate 6 is opened for the removal of crumbs. In addition, the use of non-metallic bristles in the brush 36 increases the electrical safety of the appliance. The second advantage is the speed of operation of the toaster. The bread slices are toasted virtually instantaneously as they pass the elements 23, which reach a high temperature apart from any delay caused by the delay mechanism. Finally, the motor drive arrangement 12, particularly the action of the brush 23 on the rod 33 produces little noise.

What is claimed is:

1. A toaster for toasting a slice of bread, comprising: a casing in which is located a reciprocable carriage movable towards and away from an aperture defined by said casing, through which aperture a slice of bread when mounted on said carriage can pass, a pair of enclosed electric bar heating elements disposed within said casing respectively adjacent opposed side edges of the casing which define said aperture, and a motor arrangement for driving said carriage from a first position located remote from said aperture towards said aperture into a second position at a predetermined speed, whereby a slice of bread mounted on said carriage can be made to pass between said elements to toast both sides of the slice progessively as the slice passes out of said casing through said aperture, the degree of toasting being determined by the speed of movement of said carriage, the motor arrangement comprising a vertically oriented screw threaded rod, a motor for rotatably driving said screw threaded rod, a frame mounted on the rod and forming a part of the carriage, and brush means carried on the frame with bristles which contact the screw threaded surface of the rod, operation of said motor to rotate said rod causing said bristles to follow the screw thread of the rod to move the frame and thereby the carriage along the rod from the first position of the carriage into the second position.

2. A toaster as claimed in claim 1, in which said bristles are sufficiently flexible to enable said carriage to be manually moved from the second position back into the first position.

3. A toaster as claimed in claim 1, in which said carriage comprises a bread support member attached to said frame, said support member being capable of travel between said elements so that a slice of bread mounted on said support can be completely toasted on both sides.

4. A toaster as claimed in claim 1, in which said motor arrangement and said heating elements are connected into an electrical circuit which, when connected to an electrical power supply, can be activated to cause operation of said motor arrangement and heating of said elements by movement of said carriage into the first position and deactivated by attainment of the second position by said carriage.

5. A toaster as claimed in claim 4, in which an override switch is provided whereby said motor arrangement and said heating elements can be activated when said carriage does not occupy the first position.

6. A toaster as claimed in claim 4, in which an override switch is provided whereby said motor arrangement and said heating elements can be deactivated regardless of the position of said carriage.

7. A toaster as claimed in claim 1, further comprising means for varying the speed of movement of said carriage whereby a speed can be preselected before operation of said motor arrangement according to the required degree of toasting of the slice of bread.

8. A toaster as claimed in claim 7, in which a potentiometer is connected to said motor whereby the rotary speed of said rod can be varied as desired and thereby the speed of said carriage varied to determine the degree of toasting required.

9. A toaster as claimed in claim 8, in which a pair of grilles is located within the toaster between which grilles said carriage reciprocates whereby said grilles guide a slice of bread mounted on said carriage towards said aperture as the latter moves towards the second position.

10. A toaster as claimed in claim 9, in which a first pair of reflectors is located within the toaster between which reflectors said grilles are located and a second pair of reflectors is located normal to said first pair and each defines a longitudinal slot in which a portion of one end of said carriage reciprocates.

11. A toaster as claimed in claim 1, in which said carriage reciprocates vertically and a reflective plate is located at the base of the toaster, which plate catches crumbs falling from the bread slice and can be exposed for cleaning purposes.

12. A toaster as claimed in claim 1, in which said heating elements each comprise an electrical coil enclosed within a sealed glass tube.

13. A toaster as claimed in claim 1, in which said aperture comprises a rectangular slot and said elements are respectively located adjacent the longer sides of the slot in a parallel disposition within said casing.

* * * * *